United States Patent [19]
Shih-Min

[11] Patent Number: 5,903,364
[45] Date of Patent: May 11, 1999

[54] SHEET-FED SCANNER WITH SELECTIVELY VARIABLE DOCUMENT FEED-IN AND FEED-OUT POSITIONS

[75] Inventor: Lo Shih-Min, Taichung, Taiwan

[73] Assignee: Umax Data Systems Inc., Hsinchu, Taiwan

[21] Appl. No.: 08/902,076

[22] Filed: Jul. 29, 1997

[51] Int. Cl.$^6$ ............................................. H04N 1/04
[52] U.S. Cl. ............................ 358/498; 358/474; 355/25
[58] Field of Search ................................. 358/400, 471, 358/482, 483, 474, 494, 496, 498; 382/313; 355/25, 75; 399/362

[56] References Cited

U.S. PATENT DOCUMENTS

| | | | |
|---|---|---|---|
| 3,319,546 | 5/1967 | Magnusson | 355/25 |
| 4,145,138 | 3/1979 | Mercure | 355/25 |
| 5,072,252 | 12/1991 | Howseman | 355/25 |
| 5,282,081 | 1/1994 | Chen et al. | 358/474 |
| 5,359,207 | 10/1994 | Turner | 250/208.1 |
| 5,431,389 | 7/1995 | Wensink et al. | 358/498 |
| 5,550,650 | 8/1996 | Pan | 358/474 |
| 5,805,308 | 9/1998 | Tanaka et al. | 358/486 |

*Primary Examiner*—Jon Chang
*Assistant Examiner*—Jingge Wu

*Attorney, Agent, or Firm*—Smith, Gambrell & Russell, LLP; Beveridge, DeGrandi, Weilacher & Young Intellectual Property Group

[57] ABSTRACT

A sheet-fed scanner with selectively variable document feed-in and feed-out positions is provided. The sheet-fed scanner includes conventional scanning means for performing a scanning process on a document; conventional diving means for driving the document through the scanning process, a base plate; a main body for accommodating the scanning means and the driving means therein, the main body, being mounted on the base plate and having at least a base side, a first inclined side, and a second inclined side; and a passage formed between the base plate and the main body for guiding the document through the scanning process. By resting the sheet-fed scanner on various sides of the main body, the user can feed the document from various positions: when resting on the base plate, the passage is horizontally oriented, allowing a horizontal feed-in and feed-out of the document; when resting on the first inclined side, the passage is inclined in such a manner that allows an inclined top feed-in and bottom feed-out of the document; and when resting on the second inclined side of the main body, the passage is inclined in such a manner that allows an inclined bottom feed-in and top feed-out of the document. Moreover, the main body can be shaped in either a pentagonal or trapezoidal cross section so as to elevate either the feed-in and feed-out positions for either inclined or horizontal feed-in and feed-out.

6 Claims, 2 Drawing Sheets

SHEET-FED SCANNER WITH SELECTIVELY VARIABLE DOCUMENT FEED-IN AND FEED-OUT POSITIONS

BACKGROUND OF THE INVENTION

1. Field of the Invention

This invention relates to scanners, and more particularly, to a sheet-fed scanner which allows the user to selectively arrange the feed-in and feed-out position in accordance with the user's preference.

2. Description of Related Art

Conventional sheet-fed scanners typically include a base which allows the document that is to be scanned by the scanner to be fed into the scanning position along either a horizontal path or an inclined path. For a scanner of the horizontal feed-in and feed-out type, a suitable amount of space should be provided on the rear side (the feed-out side) of the scanner so that the feed-out of the scanned document will not be impeded, for example, by the wall. For a scanner of the inclined feed-in and feed-out type, a suitable amount of space should be provided on the top side and bottom side of the scanner so that the feed-in and feed-out of the sheets will not be impeded. These requirements, however, will cause the scanners to occupy a relatively large amount of office space. Although the sheet-fed scanners have the advantage of having a smaller size than conventional flatbed scanners, the foregoing drawback will offset this advantage.

Moreover, conventional sheet-fed scanners can only allow the user to feed the sheets from a fixed feed-in position only, either a horizontal feed-in or an inclined feed-in. Those users who prefer to use inclined feed-in from the top and feed-out from the bottom may not like using scanners of the horizontal feed-in and feed-out type. There exists, therefore, a need for a new sheet-fed scanner which allows the user to selectively arrange the feed-in and feed-out position in accordance with the user's preference.

SUMMARY OF THE INVENTION

It is therefore a primary objective of the present invention to provide a sheet-fed scanner which can allow the user to selectively arrange the feed-in and feed-out position in accordance with the user's preference.

It is another objective of the present invention to provide a sheet-fed scanner which can allow the user to selectively arrange the feed-in and feed-out position in accordance with the user's preference without the need to install auxiliary equipment on the scanner.

It is still another objective of the present invention to provide a sheet-fed scanner which is not space-limited in use.

It is yet another objective of the present invention to provide a sheet-fed scanner which is simple in structure so that it is easy to manufacture and use.

In accordance with the foregoing and other objectives of the present invention, a new sheet-fed scanner is provided.

In a first preferred embodiment, the sheet-fed scanner includes the following constituent elements:

(a) scanning means for performing a scanning process on a document;

(b) driving means for driving the document through the scanning process;

(c) a base plate;

(d) a main body for accommodating the scanning means and the driving means therein, the main body being mounted on the base plate and having at least a base side, a first inclined side, and a second inclined side; and (e) a passage for guiding the document through the scanning process, the passage being formed between the base plate and the main body having a feed-in opening for inputting the document and a feed-out opening for outputting the scanned document.

With the foregoing sheet-fed scanner, the user can feed the document in the following various manners:

(1) provided that the sheet-fed scanner is disposed to rest on the base plate, the passage is horizontally oriented so that the feed-in opening and the feed-out opening thereof are level with each other, allowing a horizontal feed-in and feed-out of the document;

(2) provided that the sheet-fed scanner is disposed to rest on the first inclined side of the main body, the passage is inclined in such a manner that the feed-in opening is near the top, while the feed-out opening is near the bottom, allowing an inclined top feed-in and bottom feed-out of the document; and (3) provided that the sheet-fed scanner is disposed to rest on the second inclined side of the main body, the passage is inclined in such a manner that the feed-in opening is near the bottom, while the feed-out opening is near the top, allowing an inclined bottom feed-in and top feed-out of the document.

In a second preferred embodiment, the main body is substantially shaped with a pentagonal cross section having a base side, a pair of parallel lateral sides perpendicular to the base side, a first inclined side, and a second inclined side. With this sheet-fed scanner, the feed-in opening and the feed-out opening can be elevated to a height above the table surface when the main body rests on either the first inclined side or the second inclined side.

Moreover, in a third preferred embodiment, the main body is shaped with a trapezoidal cross section having a base side, a top side parallel to the base side, a first inclined side, and a second inclined side. With this sheet-fed scanner, the user can feed the document in one additional manner that, provided that the sheet-fed scanner rests on the top side, the passage is horizontally oriented and elevated to a height so that the feed-in opening and the feed-out opening thereof are level with each other, allowing an elevated horizontal feed-in and a horizontal feed-out of the document.

The scanning means is conventional in structure and includes light source and image sensor. The driving means is also a conventional structure that includes rollers and a guiding mechanism for guiding the document through the scanning process.

The sheet-fed scanner of the invention can be disposed in various orientations that allow the user to feed the document in various manners in accordance with the user's particular preference or the available amounts of space in the environment where the sheet-fed scanner is installed. The sheet-fed scanner is therefore very convenient to use.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Referring to FIGS. 1 through 4, a first preferred embodiment of the sheet-fed scanner includes a main body 1, a driving mechanism 2 for feeding a document sheet through the scanning process in the scanner, a light source 3 for illuminating the document during the scanning process, and an image sensor 4 for converting the image of the scanned document into digital image signals for subsequent processing and editing.

Figure 1:
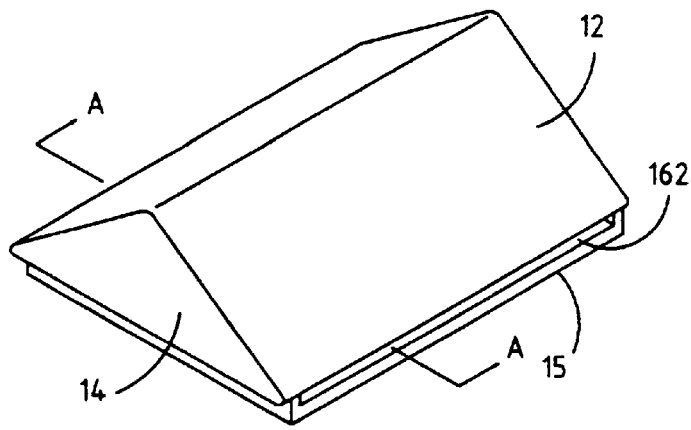
FIG. 1 is a schematic perspective view of a first preferred embodiment of the sheet-fed scanner according to the invention.

The main body 1 is substantially triangular in cross section, having a base side 13, a first inclined side 11, and a second inclined side 12. Moreover the main body 1 has two lateral sides 14 (FIG. 1). The main body 1 has a hollowed inside 17 for accommodating the driving mechanism 2, light source 3, and image sensor 4 therein. The driving mechanism 2 is mounted on the base side 13. The main body 1 is mounted on a base plate 15. A passage 16 having a feed-in opening 162 and a feed-out opening 164 is provided between the base side 13 and the base plate 15. The internal structures of the driving mechanism 2, the light source 3, and the image sensor 4 are conventional structures so the description thereof will not be further detailed.

Figure 2:
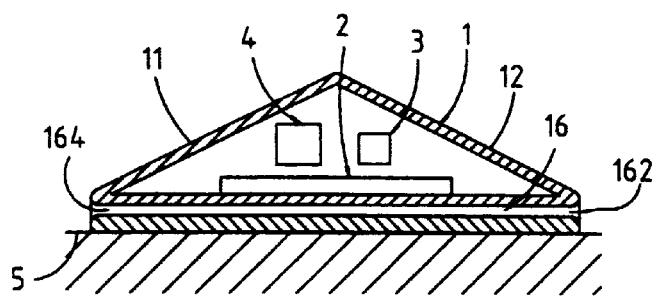
FIG. 2 is a schematic sectional view of the sheet-fed scanner of FIG. 1 cutting through the line A—A when resting on a base side thereof.

When the sheet-fed scanner rests on the base plate 15 as shown in FIG. 2, the passage 16 is horizontally oriented so that the feed-in opening 162 and the feed-out opening 164 thereof are horizontally level with each other. This allows the user to feed a sheet (not shown) horizontally into the feed-in opening 162 and subsequently receive the feed-out sheet also horizontally frown the feed-out opening 164. The result is a horizontal feed-in and feed-out operation of the document.

Figure 3:
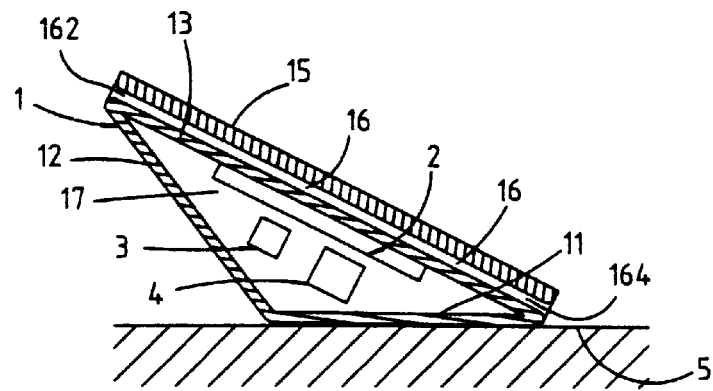
FIG. 3 is a schematic sectional view of the sheet-fed scanner of FIG. 1 cutting through the line A—A when resting on a first inclined side thereof.

Further, when the sheet-fed scanner rests on the first inclined side 11 as shown in FIG. 3, the passage 16 is inclined in such a manner that the feed-in opening 162 is near the top, while the feed-out opening 164 is near the bottom. This allows the user to feed a sheet (not shown) in an inclined manner into the feed-in opening 162 and subsequently receive the feed-out sheet from the feed-out opening 164 on the bottom. The result is an inclined top feed-in and bottom feed-out operation of the document.

Figure 4:
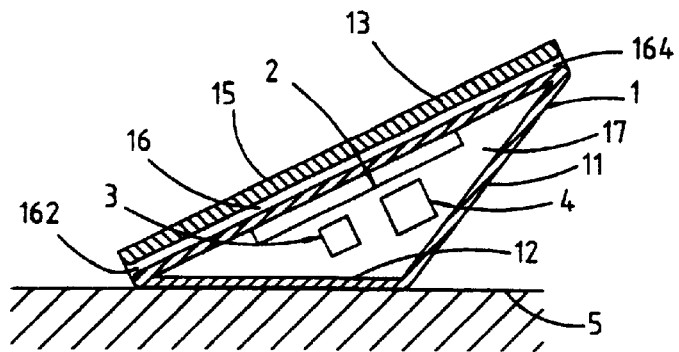
FIG. 4 is a schematic sectional view of the sheet-fed scanner of FIG. 1 cutting through the line A—A when resting on a second inclined side thereof.

Further, when the sheet-fed scanner rests on the second inclined side 12 as shown in FIG. 4, the passage 16 is inclined in such a manner that the feed-in opening 162 is near the bottom, while the feed-out opening 164 is near the top. This allows the user to feed a sheet (not shown) into the feed-in opening 162 near the bottom and subsequently receive the feed-out sheet from the feed-out opening 164 near the top. The result is an inclined bottom feed-in and top feed-out operation of the document.

As described above, the first preferred embodiment of the sheet-fed scanner of the invention can be disposed in three different orientations that allow the laser to feed the sheet in various manners in accordance with the user's particular preference or the available amounts of space in the environment where the sheet-fed scanner is installed. The sheet-fed scanner is therefore very convenient to use.

Figure 5:
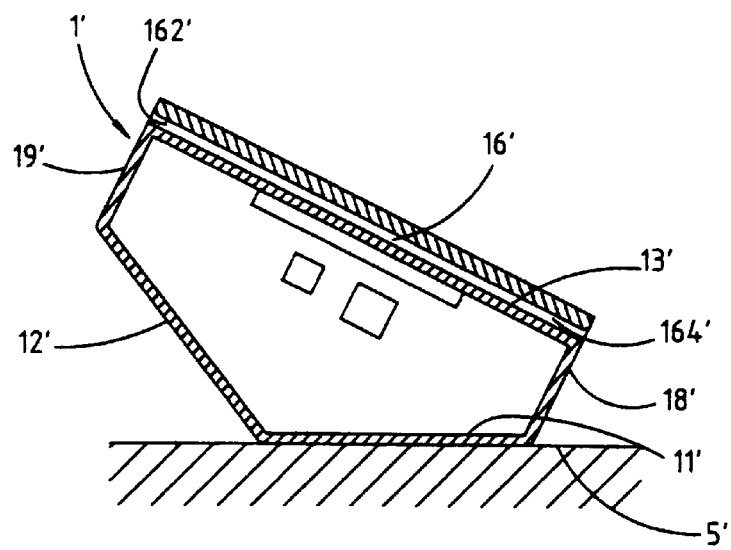
FIG. 5 is a schematic sectional view of a second preferred embodiment of the sheet-fed scanner according to the invention when resting on an inclined side thereof.

FIG. 5 is a schematic sectional view of a second preferred embodiment of the sheet-fed scanner according to the invention. This embodiment differs from the previous one in that the main body (here designated by the reference numeral 1') is shaped with a pentagonal cross section having a base side 13', a pair of parallel lateral sides 18', 19' oriented perpendicular to the base side 13', a first inclined side 11', and a second inclined side 12'.

As the first preferred embodiment, this second preferred embodiment of the sheet-fed scanner can be disposed to rest either on the base side 13', the first inclined side 11', or the second inclined side 12', so as to allow the user to feed sheets (not shown) into the sheet-fed scanner in various manners as described earlier. In particular, FIG. 5 shows the sheet-fed scanner resting on the first inclined side 11' so that the passage 16' is inclined in such a manner that the feed-in opening 162' is near the top, while the feed-out opening 164' is near the bottom. This allows the user to feed a sheet (not shown) in an inclined manner into the feed-in opening 162' near the top and subsequently receive the feed-out sheet from the feed-out opening 164' near the bottom. In this embodiment, the elevation of the feed-out opening 164' allows the user to more conveniently take out the scanned document from the feed-out opening 164'.

Figure 6:
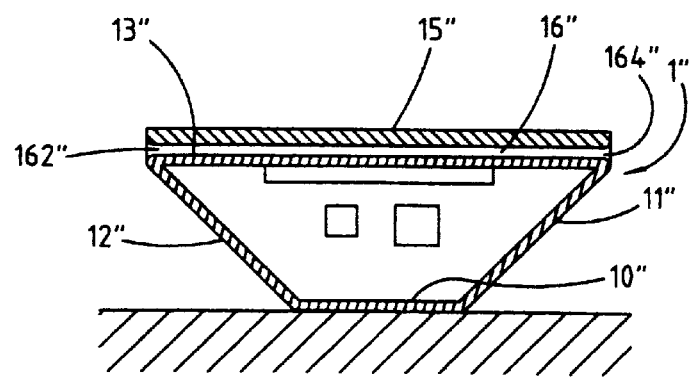
FIG. 6 is a schematic sectional view of a third preferred embodiment of the sheet-fed scanner according to the invention when resting on a top side thereof.

FIG. 6 is a schematic sectional view of a third preferred embodiment of the sheet-fed scanner according to the invention. This embodiment differs from the previous two in that the main body (here designated by the reference numeral 1") is shaped with a trapezoidal cross section having a base side 13", a top side 10" oriented in parallel to the base side 13", a first inclined side 11", and a second inclined side 12".

As in the previous embodiments, this third preferred embodiment of the sheet-fed scanner can rest either on the base side 13", the first inclined side 11", or the second inclined side 12", so as to allow the user to feed sheets (not shown) into the sheet-fed scanner in the various manners as described earlier. However, in particular. FIG. 6 shows the sheet-fed scanner being disposed to rest on the top side 10" so that the passage 16" is elevated from the table surface. The passage 16" is horizontally oriented so that the feed-in opening 162" and the feed-out opening 164" thereof are horizontally level with each other at an elevated height. This allows the user to feed a sheet (not shown) horizontally into the feed-in opening 162" and subsequently receive the feed-out sheet also horizontally from the feed-out opening 164". The elevation of the feed-in opening 162" and feed-out opening 164" allows more convenience in the feed-in operation for the user.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A sheet-fed scanner, comprising:

scanning means for performing a scanning process on a document;

driving means for driving the document through the scanning process;

a base plate;

a main body for accommodating said scanning means and said diving means therein, said main body being mounted on said base plate and having at least a base side, a first inclined side, and a second inclined side;

a passage for guiding the document through the scanning process, said passage being formed between said base plate and said main body, having a feed-in opening for inputting the document and a feed-out opening for outputting the scanned document;

wherein provided that the sheet-fed scanner rests on the base plate, said passage is horizontally oriented so that the feed-in opening and the feed-out opening thereof are level with each other, allowing a horizontal feed-in and feed-out of the document;

provided that the sheet-fed scanner rests on the first inclined side of said main body, said passage is inclined in such a manner that the feed-in opening is near the top, while the feed-out opening is near the bottom, allowing an inclined top feed-in and bottom feed-out of the document; and provided that the sheet-fed scanner rests on the second inclined side of said main body, said passage is inclined in such a manner that the feed-in opening is near the bottom, while the feed-out opening is near the top, allowing an inclined bottom feed-in and top feed-out of the document.

2. The sheet-fed scanner of claim 1, wherein said main body is substantially triangularly shaped, with the base side, the first inclined side, and the second inclined side constituting the three sides of the triangular shape thereof.

3. The sheet-fed scanner of claim 1, wherein said main body is shaped with a pentagonal cross section, having a pair of parallel lateral sides in addition to the base side, the first inclined side, and the second inclined side, said lateral sides having a first end connected perpendicular to the base side and a second end connected to the first and second inclined sides respectively.

4. The sheet-fed scanner of claim 1, wherein said main body is substantially trapezoidal shaped, having a top side in addition to the base side, the first inclined side, and the second inclined side, said top side being oriented in parallel with the base side, provided that the sheet-fed scanner rests on said top side, said passage thereof is horizontally oriented and elevated to a height so that the feed-in opening and the feed-out opening are level with each other, allowing an elevated horizontal feed-in and a horizontal feed-out of the document.

5. A sheet-fed scanner comprising:

scanning means for performing a scanning process on a document;

driving means for driving the document through the scanning process;

a base plate;

a main body for accommodating said scanning means and said driving means therein, said main body being mounted on said base plate and substantially shaped with a pentagonal cross section having a base side, a pair of parallel lateral sides perpendicular to the base side, a first inclined side, and a second inclined side;

a passage for guiding the document through the scanning process, said passage being formed between said base plate and said main body, having a feed-in opening for inputting the document and a feed-out opening for outputting the scanned document;

wherein provided that the sheet-fed scanner is rests on the base plate, said passage is horizontally oriented so that the feed-in opening and the feed-out opening are level with each other, allowing a horizontal feed-in and feed-out of the document;

provided that the sheet-fed scanner is disposed to rest on the first inclined side of said main body, said passage is inclined in such a manner that the feed-in opening is near the top, while the feed-out opening is near the bottom, allowing an inclined top feed-in and bottom feed-out of the document;

provided that the sheet-fed scanner is disposed to rest on the second inclined side of said main body, said passage is inclined in such a manner that the feed-in opening is near the bottom, while the feed-out opening is near the top, allowing an inclined bottom feed-in and top feed-out of the document.

6. A sheet-fed scanner, comprising:

scanning means for performing a scanning process on a document;

driving means for driving the document through the scanning process;

a base plate;

a main body for accommodating said scanning means and said driving means therein said main body being mounted on said base plate and substantially shaped with a trapezoidal cross section having a base side, a top side in parallel to the base side, a first inclined side, and a second inclined side;

a passage therein for guiding the document through the scanning process, said passage being formed between said base plate and said main body, having a feed-in opening for inputting the document and a feed-out opening for outputting the scanned document;

wherein provided that the sheet-fed scanner rests on the base plate, said passage is horizontally oriented so that the feed-in opening and the feed-out opening are level with each other allowing a horizontal feed-in and feed-out of the document;

provided that the sheet-fed scanner rests on the first inclined side of said main body, said passage is inclined in such a manner that the feed-in opening is near the top, while the feed-out opening is near the bottom, allowing an inclined top feed-in and bottom feed-out of the document;

provided that the sheet-fed scanner rests on the second inclined side of said main body; said passage is inclined in such a manner that the feed-in opening is near the bottom, while the feed-out opening is near the top, allowing an inclined bottom feed-in and top feed-out of the document; and provided that the sheet-fed scanner rests on said top side, said passage is horizontally oriented and elevated to a height so that the feed-in opening and the feed-out opening thereof are level with each other, allowing an elevated horizontal feed-in and a horizontal feed-out of the document.

* * * * *